United States Patent [19]
Wright

[11] 3,990,719
[45] Nov. 9, 1976

[54] TOW BAR AND HITCH ASSEMBLY

[75] Inventor: John T. Wright, Cattaraugus, N.Y.

[73] Assignee: Champion International Corporation, Stamford, Conn.

[22] Filed: Aug. 25, 1975

[21] Appl. No.: 607,293

[52] U.S. Cl. ............................... 280/408; 213/85; 213/208; 280/491 R; 280/504
[51] Int. Cl.² ............................................. B60D 1/04
[58] Field of Search ............... 280/408, 410, 491 R, 280/491 A, 491 B, 491 C, 491 D, 491 E, 482, 504; 213/78, 85, 96, 182, 208

[56] References Cited
UNITED STATES PATENTS

| | | | |
|---|---|---|---|
| 1,820,765 | 8/1931 | Anderson | 280/491 A |
| 2,309,850 | 2/1943 | Klawitter | 280/491 A |
| 2,859,050 | 11/1958 | Stonerock et al. | 280/493 X |
| 3,572,764 | 3/1971 | Rubin | 280/491 A |
| 3,785,678 | 1/1974 | Shearer | 280/408 |

Primary Examiner—Robert R. Song
Assistant Examiner—John A. Pekar
Attorney, Agent, or Firm—Evelyn M. Sommer

[57] ABSTRACT

A tow bar and hitch assembly for coupling together industrial carts so they can be towed in train-like fashion. A hitch member is fixed to the bed of a towing cart and receives a tow bar rotatably and slidingly supported by the bed of a towed cart. When not in use, the tow bar can be retracted to a stowed position beneath the towed cart by removing it from the hitch, rotating it to clear an abutment with a stop member which locks the tow bar against movement when extended, and then sliding the tow bar rearwardly.

10 Claims, 6 Drawing Figures

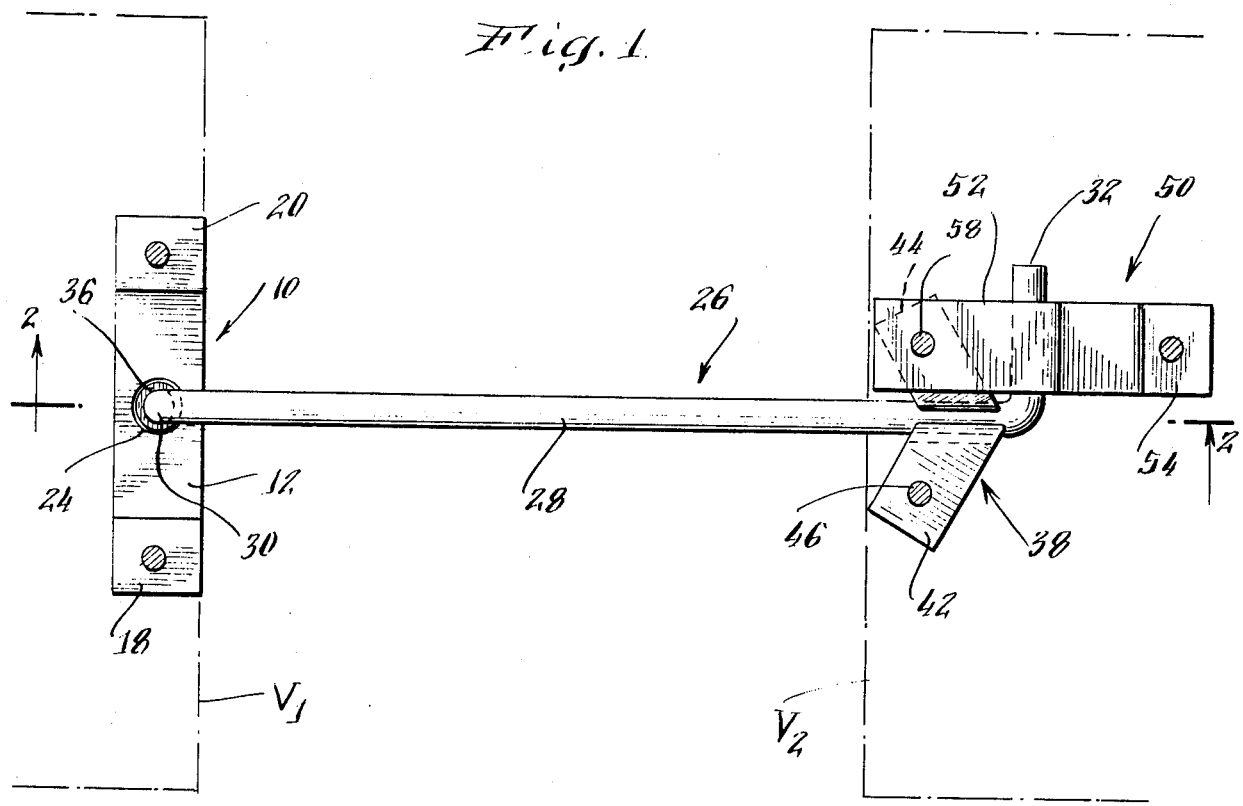
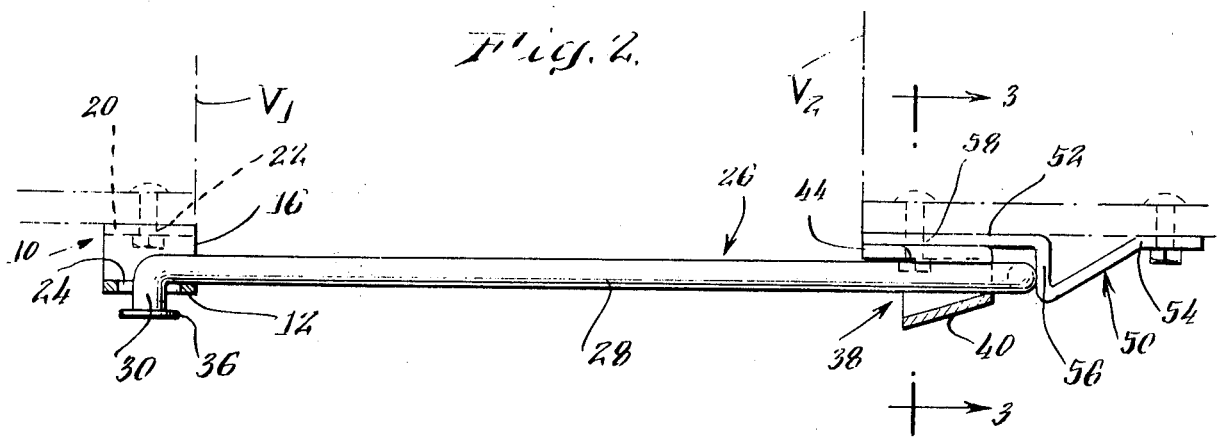
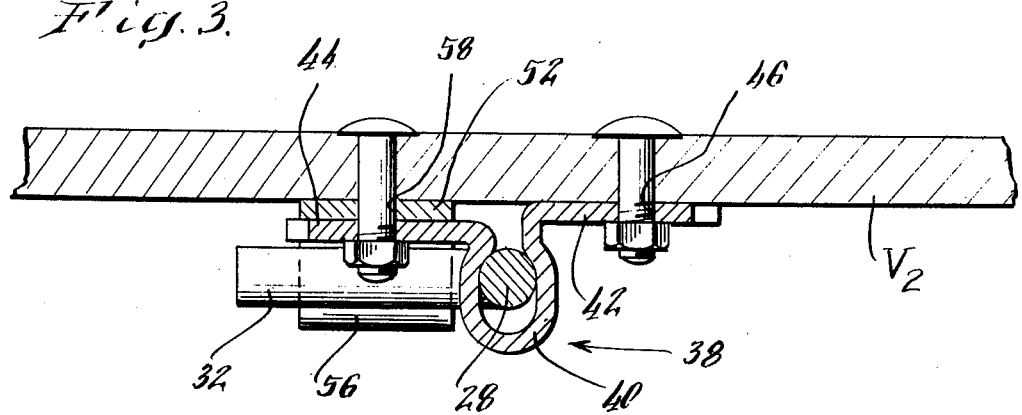

TOW BAR AND HITCH ASSEMBLY

BACKGROUND OF THE INVENTION

1. Field of the Invention

This invention relates to a tow bar and hitch assembly for coupling together industrial vehicles, such as carts, in train-like fashion.

2. Description of Prior Art

Carts are used extensively in industry in the transporting of goods from one location to another. Such carts generally find wide use in warehousing operations where they are used to shift the location of stored goods from one place to another within the warehouse, or to load and unload goods from vehicles such as railroad freight cars and highway tractor trailers. Further, such carts generally find wide use in major manufacturing facilities where they are widely used to transport goods from a storage location to a work station, or between storage locations, or between work stations.

A typical type prior art cart is that which is structured to include a flat bed provided with either a three or four-wheel suspension system. The bed allows the goods to be stacked thereon, and the wheels allow the cart to be easily rolled or pushed from one location to another. Such a cart is often provided with walls which extend upwardly from the bed of the cart, the walls having doors for easy loading and unloading of the cart.

It is known to provide in combination with such carts, a coupling device for connecting a pair of carts. This enables a plurality of similar carts to be coupled together, and pulled in a train-like fashion by a motorized vehicle. Generally, the main structure of the coupling device is located at the head or front end of the cart, which is interconnected with suitable structure at the tail or rear end of a similar cart, thereby allowing a plurality of the carts to be interconnected in train-like fashion. The train of carts may then be pulled around a warehouse, or a manufacturing or retail facility, by a motorized vehicle such as a work truck especially designed for that purpose. This provides economy of capital equipment in that only one motorized vehicle is required to service a multiplicity of carts.

Prior art coupling devices for connecting one cart to another and to a vehicle are generally not retractable and accordingly, when the carts are not in use the coupling device projects outwardly from the front of the cart and creates a safety hazard. Thus, it has been found desirable to provide a coupling device that retracts completely back underneath the bed of the cart when not in use.

Coupling devices which solve this basic problem are known. However, such retractable coupling devices are complex in structure, thereby making their maintenance relatively difficult and their initial manufacture relatively expensive.

SUMMARY OF THE INVENTION

In accordance with this invention, a novel, retractable coupling device is provided for connecting industrial vehicles or carts in train-like fashion, and consists of four simple components which are considerably less expensive to manufacture and which are lighter in weight and thus easier to install and maintain than known comparable devices.

The coupling device comprises a retractable tow bar and hitch assembly. The hitch, which is generally U-shaped in cross-section is fixed to the rear end of the cart bed. A tow bar retainer and a tow bar stop are located on the front end of the cart for retaining and locking a tow bar in extended position wherein it can be coupled to the hitch located on the rear end of the adjacent cart. Alternatively, the tow bar can be retracted and stowed underneath the cart bed in the tow bar retainer when not in use.

The tow bar consists of an elongated body portion having a pair of legs at opposite ends thereof. Each of the legs extend perpendicular to the body portion of the tow bar, except one of the legs is in a substantially vertical plane, while the other leg is in a substantially horizontal plane. In its extended position, the vertical leg of the tow bar is dropped through an aperture in the bight portion of the U-shaped hitch. The horizontal leg at the other end of the tow bar is slidingly and rotatably within a semi-ovate-cylindrical pocket in the tow bar retainer and forward movement of the tow bar relative to the cart being towed is precluded by abutment of the horizontal leg with the rear edge of the support pocket. Rearward or backward movement of the tow bar in its extended position is precluded by abutment of the horizontal leg of the tow bar with a portion of the tow bar stop. In order to stow the tow bar when not in use, it is only necessary to remove the tow bar from the aperture in the hitch, rotate the tow bar 90° in the tow bar retainer pocket so that the horizontal leg assumes a vertical position and slide the tow bar rearwardly past the tow bar stop. The tow bar retainer holds the tow bar snuggly in its retracted position.

The hitch member is also designed so as to limit "jack-knifing" of the towed cart. This is accomplished by providing for abutment of the elongated body portion of the tow bar with the legs of the U-shaped hitch should the towed cart pivot relative to the towing cart.

Further objects and advantages of the invention will become more apparent from the following description and claims and from the accompanying drawings wherein:

BRIEF DESCRIPTION OF THE DRAWINGS

FIG. 1 is a top plan view of the tow bar and hitch assembly of the present invention;

FIG. 2 is a cross-sectional view taken substantially along the plane indicated by the line 2—2 of FIG. 1;

FIG. 3 is a cross-sectional view taken substantially along the plane indicated by the line 3—3 of FIG. 2;

DETAILED DESCRIPTION OF THE PREFERRED EMBODIMENT

Figure 4:
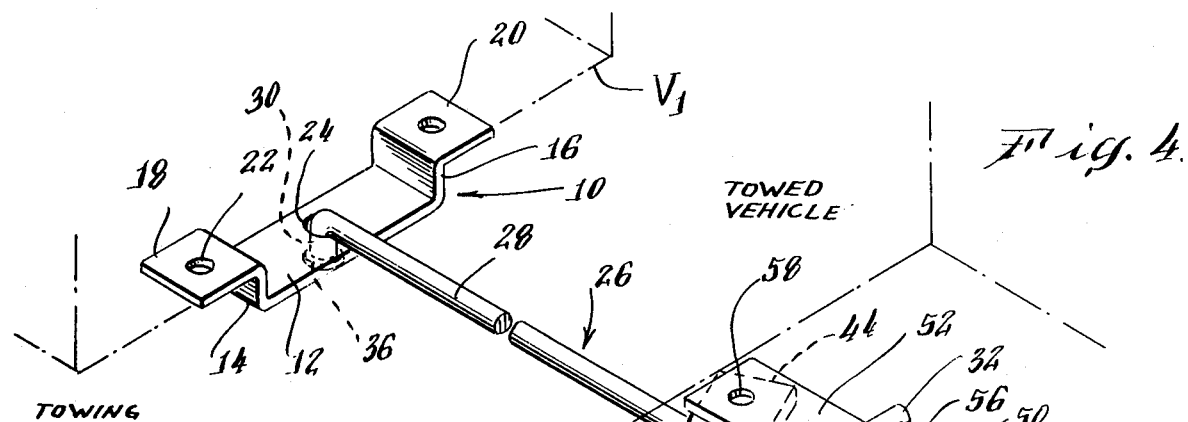
FIG. 4 is a perspective view of the components of the tow bar and hitch asembly of the present invention.

Referring now in detail to the drawings, wherein like numerals indicate like elements throughout the several views, the tow bar and hitch assembly of the present invention is illustrated in both FIGS. 1 and 4 in its extended position wherein two cart-like vehicles $V_1$ and $V_2$ are coupled together in train-like fashion so that they can be towed in tandem by a motorized vehicle.

The towing vehicle $V_1$ has a hitch member 10 connected to the rear of its bed. Hitch member 10 is substantially U-shaped in cross-section and includes a bight portion 12, a leg 14, and a leg 16 connected to opposite ends of the bight portion 12. A lateral extension 18 and 20 connected to each of the legs 14 and 16 respectively. The lateral extensions 18 and 20 include apertures 22 for receiving a fastener to secure hitch member 10 to the bed of cart $V_1$. The bight portion 12 of hitch number 10 includes a centrally located aperture 24 for receiving a portion of a tow bar generally designated by a numeral 26 which is used to couple cart $V_1$ to the second cart-like vehicle $V_2$.

Tow bar 26 includes an elongated body portion 28 and a leg 30 and 32 connected to each end of body portion 28. Each of the legs 30 and 32 extend substantially perpendicular to the body portion 28 of the tow bar 26, but leg 32 is in a substantially horizontal plane, while leg 30 is in a substantially vertical plane. These planes are formed by each of the legs with the elongated body portion 28 of tow bar 26.

As shown in FIGS. 1, 2 and 4, when the tow bar 26 is in its use or extended position, vertical leg 30 is positioned within aperture 24 of bight portion 12 of hitch number 10 to couple cart-like vehicle $V_1$ to cart-like vehicle $V_2$. The distal end of vertical leg 30 of tow bar 26 has a retaining ring 36 welded to it to aid in maintaining the coupled engagement of tow bar 26 and hitch member 10, as retaining ring 36 precludes accidental dislodgement of vertical leg 30 from aperture 24. Aperture 24 is large enough to pass the retaining ring 36 therethrough, but the relative linear movement of the carts during transit renders it virtually impossible to align the ring 36 with the aperture 24 so that the vertical leg 30 of the tow bar 26 can bounce out of the hitch 10.

Tow bar 26 is normally carried beneath the bed of vehicle $V_2$ in a tow bar retainer bracket 38 secured to the front of the bed of vehicle $V_2$. Tow bar retainer bracket 38 includes a semi-ovate-cylindrical pocket 40 whose sides terminate in oppositely extending wings 42 and 44. As shown in FIGS. 2 and 3, pocket 40 slopes downwardly towards the towing vehicle $V_1$. The wings 42 and 44 of tow bar retainer bracket 38 each include an aperture 46 for receiving a suitable fastener to attach the tow bar retainer bracket to the bed of cart vehicle $V_2$ adjacent its forward end. When vertical leg 30 of the tow bar 26 is disposed within aperture 24 in the bight portion 12 of the hitch member 10, the horizontal leg 32 at the other end of the elongated body portion 28 of the tow bar 26 will abut edge 48 of the semi-cylindrical pocket 40 of tow bar retainer bracket 38 to preclude forward movement of the tow bar 26 relative to cart-like vehicle $V_2$ so that vehicle $V_2$ will move forwardly as vehicle $V_1$ is towed.

In order to lock tow bar 26 in its extended position and to preclude backward movement of the tow bar 26 and cart-like vehicle $V_1$ relative to cart-like vehicle $V_2$, a tow bar stop generally designated by a numeral 50 is also attached to the bed of cart-like vehicle $V_2$ to one side of the longitudinal axis of elongated body portion 28 of tow bar 26. Tow bar stop 50 is substantially Z-shaped in cross-section and includes oppositely extending legs 52 and 54 joined by a vertically extending central portion 56. Each of the legs 52 and 54 include an aperture 58 to receive a suitable fastener to secure tow bar stop 50 to the bed of the cart-like vehicle $V_2$ adjacent tow bar retainer bracket 38. As shown in FIG. 3 the aperture 58 in leg 52 of stop 50 is aligned with aperture 46 in wing 44 of tow bar retainer bracket 38 and a common fastener is used to secure the bracket and stop to the bed of vehicle $V_2$. When tow bar 26 is in its extended position, the central portion 56 of tow bar stop 50 will abut the horizontal leg 32 of tow bar 26 to preclude rearward movement of the tow bar 26 relative to the cart-like vehicle $V_2$.

Figure 5:
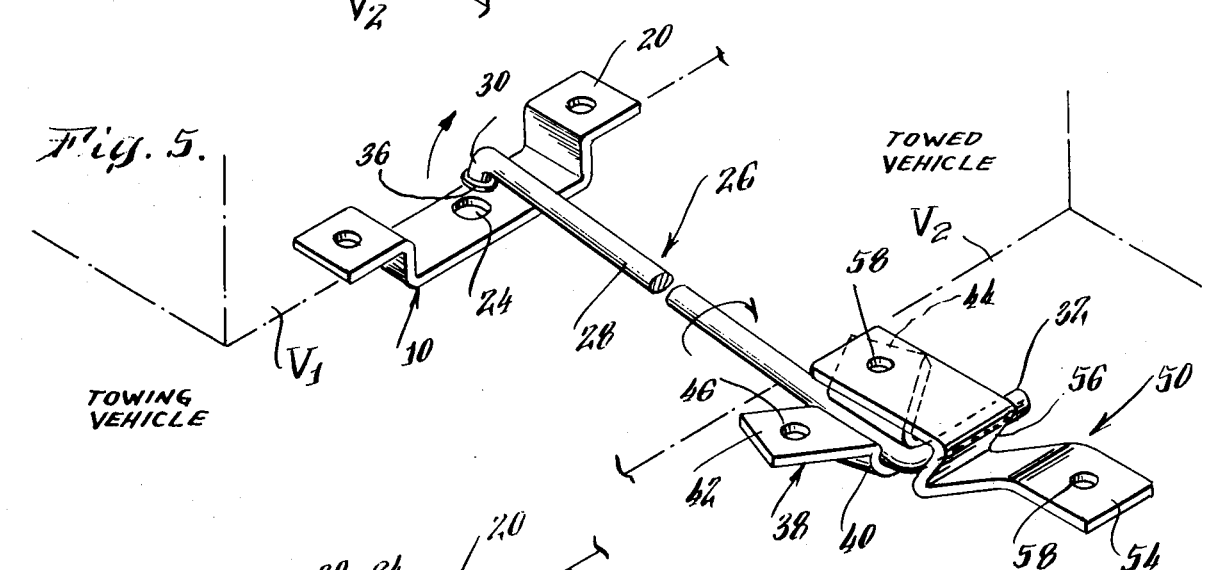
FIG. 5 is a view similar to FIG. 4 but illustrating an intermediate step in uncoupling the tow bar from the towing vehicle in preparation for stowing it.
Figure 6:
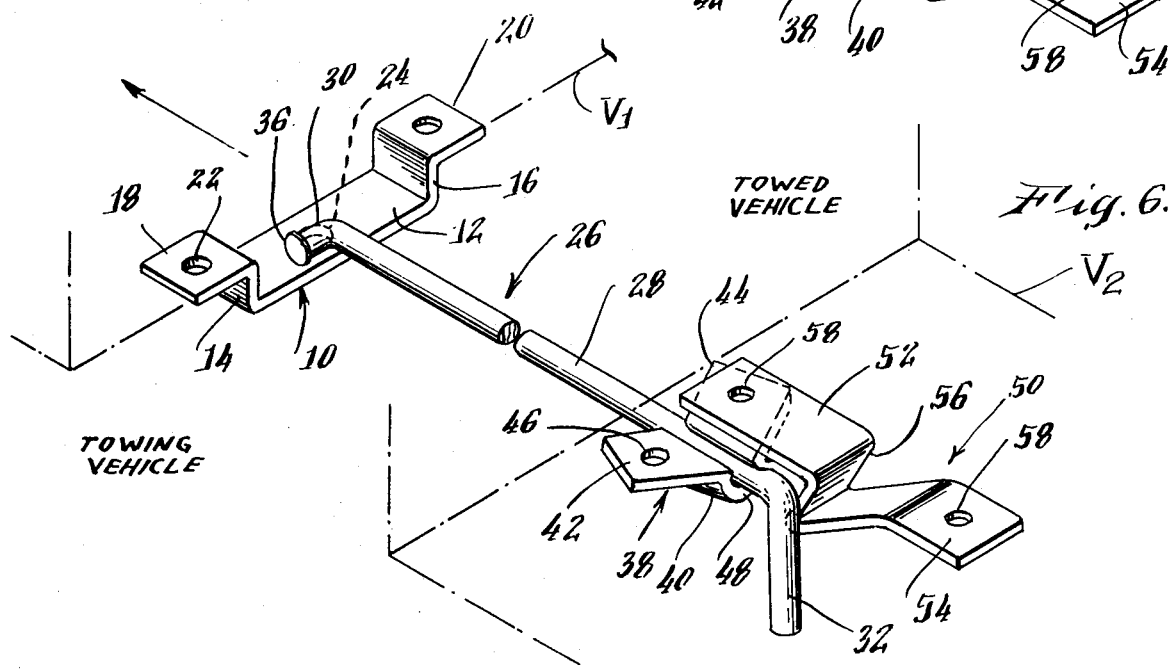
FIG. 6 is a view similar to FIG. 5, but illustrating a still further step in the retraction of the tow bar to a stowed position beneath the towed vehicle.

When cart-like vehicle $V_2$ is not in use, it is only necessary to lift leg 30 out of aperture 24, as shown in FIG. 5, and rotate the elongated body portion 28 of tow bar 26 90° so that legs 30 and 32 reverse their planes of orientation as shown in FIG. 6. Tow bar 26 can rotate in the semi-ovate-cylindrical pocket 40 of tow bar retainer bracket 38. When the tow bar 26 has assumed the position shown in FIG. 6, the elongated body 28 of tow bar 26 can be slid rearwardly since leg 32 of tow bar 26 will no longer be in abutment with the central portion 56 of the tow bar stop 50. When in its fully retracted position, tow bar retainer bracket 38 will snuggly hold the tow bar 26 underneath the bed of the cart-like vehicle $V_2$.

In order to extend the tow bar 26 to couple vehicle $V_2$ to vehicle $V_1$, the elongated body portion 28 of tow bar 26 is slid forwardly in tow bar retainer bracket 38, rotated 90° opposite to that shown in FIG. 5 to position horizontal leg 32 in abutment with edge 48 of the semi-ovate-cylindrical pocket 40 of the tow bar bracket 38 and the central portion 56 of tow bar stop 50, while dropping vertical leg 30 through aperture 24 in the bight portion 12 of hitch 10. Sloping pocket 40 allows tow bar 26 freedom of movement in a vertical plane so that vertical leg 30 can be disposed through aperture 24.

Hitch member 10 is also designed so as to preclude "jack-knifing" of cart-like vehicle $V_2$ relative to cart-like $V_1$ as they are towed. This is accomplished by dimensioning the width of the hitch member 10 between its legs 14, 16 relative to the length of the elongated body portion 28 of tow bar 26 so that the legs of the hitch member will limit any pivotal movement of the tow bar 26 relative to the hitch member 10 by abutment with the elongated body portion 28 of the tow bar. This will prevent damage to any doors which may be opened on cart-like vehicle $V_1$.

The tow bar and hitch assembly of the present invention is of simple construction, consisting of four parts, namely hitch 10, tow bar 26, tow bar retainer bracket 38, and tow bar stop 50. As a consequence, the assembly is less expensive to manufacture than retractable tow bar and hitch assemblies which have been commonly used heretofore, is of lighter weight, and thus, easier to install and maintain. It will be understood that each vehicle $V_1$ and $V_2$ will be provided with a hitch member and tow bar, tow bar retainer, and tow bar stop at opposite ends of their beds so they can be towed as well as serve as a towing vehicle.

What is claimed is:
1. A tow bar and hitch assembly for coupling together a pair of vehicles comprising:
   a tow bar adapted to be carried by a first one of said vehicles having an extended position wherein it can be connected to a hitch member fixed to another of said vehicles, said tow bar including
   an elongated body portion,
   a leg connected to each end of said body portion, each of said legs extending substantially perpendicular to the body portion of said tow bar, but one of said legs being in a substantially horizontal plane and the other of said legs being in a substantially vertical plane, the leg in said vertical plane being adapted to be coupled to said hitch member, tow bar retainer means adapted to be fixed to said first vehicle for abutment with the horizontal leg of said tow bar in its extended position to preclude forward movement of said tow bar relative to said first vehicle, said tow bar retaining means including means for rotatably and slidingly supporting the elongated body portion of said tow bar, and stop means adapted to be fixed to said first vehicle for abutment with the horizontal leg of said tow bar when said tow bar is extended and said vertical leg is coupled to said hitch member to preclude rearward movement of said tow bar relative to said first vehicle, said stop means being positioned to one side of the longitudinal center line of the elongated body portion of said tow bar, and being substantially Z-shaped in cross-section, the central portion thereof forming the abutment for the horizontal leg of said tow bar precluding rearward movement of said tow bar relative to said first vehicle, whereby upon uncoupling of said vertical leg from said hitch member, the body portion of said tow bar can be rotated within said tow bar retainer means to reverse the planes of orientation of said legs so that the horizontal leg is no longer in abutment with said stop means and said tow bar can be retractably slid rearward to a stowed position beneath said first vehicle.

2. A tow bar and hitch assembly in accordance with claim 1 including means for retaining the vertical leg of said tow bar in coupled relation to said hitch member.

3. A tow bar and hitch assembly in accordance with claim 1 wherein said hitch member is substantially U-shaped in cross-section, the bight portion thereof including an aperture for pivotably receiving the vertical leg of said tow bar.

4. A tow bar and hitch assembly in accordance with claim 3 including means for retaining said vertical leg of said tow bar in coupled relation to said hitch member, said retaining means including a retaining ring connected to the distal end of said vertical leg.

5. A tow bar and hitch assembly in accordance with claim 1 wherein said hitch member is substantially U-shaped in cross-section, the bight portion thereof including an aperture for pivotably receiving the vertical leg of said tow bar, the width of said hitch member between its legs being of a dimension relative to said tow bar so that the legs of said hitch member will limit the pivotal movement of said tow bar relative to said hitch member through abutment with the elongated body portion of said tow bar.

6. A tow bar and hitch assembly in accordance with claim 5 including means for retaining said vertical leg of said tow bar in coupled relation to said hitch member, said retaining means including a retaining ring connected to the distal end of said vertical leg.

7. A tow bar and hitch assembly for coupling together a pair of vehicles comprising:

a tow bar adapted to be carried by a first one of said vehicles having an extended position wherein it can be connected to a hitch member fixed to another of said vehicles, said tow bar including an elongated body portion, a leg connected to each end of said body portion, each of said legs extending substantially perpendicular to the body portion of said tow bar, but one of said legs being in a substantially horizontal plane and the other of said legs being in a substantially vertical plane, the leg in said vertical plane being adapted to be coupled to said hitch member, tow bar retainer means adapted to be fixed to said first vehicle for abutment with the horizontal leg of said tow bar in its extended position to preclude forward movement of said tow bar relative to said first vehicle, said tow bar retaining means including means for rotatably and slidingly supporting the elongated body portion of said tow bar, said tow bar retaining means further including a bracket, while said means for rotatably and slidingly supporting the elongated body portion of said tow bar includes a substantially semi-ovate-cylindrical pocket comprising the central portion of said bracket, an edge of said pocket providing the abutment for the horizontal leg of said tow bar precluding forward movement of said tow bar relative to said first vehicle, and stop means adapted to be fixed to said first vehicle for abutment with the horizontal leg of said tow bar when said tow bar is extended and said vertical leg is coupled to said hitch member to preclude rearward movement of said tow bar relative to said first vehicle, said stop means being positioned to one side of the longitudinal center line of the elongated body portion of said tow bar, whereby upon uncoupling of said vertical leg from said hitch member, the body portion of said tow bar can be rotated within said tow bar retainer means to reverse the planes of orientation of said legs so that the horizontal leg is no longer in abutment with said stop means and said tow bar can be retractably slid rearward to a stowed position beneath said first vehicle.

8. A tow bar and hitch assembly in accordance with claim 7 wherein said stop means is substantially Z-shaped in cross-section, the central portion thereof forming an abutment for the horizontal leg of said tow bar precluding rearward movement of said tow bar relative to said first vehicle.

9. A tow bar and hitch assembly for coupling together a pair of vehicles comprising a tow bar adapted to be carried by a first one of said vehicles having an extended position wherein it can be connected to a hitch member fixed to another of said vehicles, said tow bar including an elongated body portion, a leg connected to each of said body portion, each of said legs extending substantially perpendicular to the body portion of said tow bar, but one of said legs being in a substantially horizontal plane and the other of said legs being in a substantially vertical plane, the leg in said vertical plane being adapted to be coupled to said hitch member, tow bar retainer means adapted to be fixed to said first vehicle for abutment with the horizontal leg of said tow bar in its extended postion to preclude forward movement of said tow bar relative to said first vehicle, said tow bar retaining means including means for rotatably and slidingly supporting the elongated body portion of said tow bar, stop means adapted to be fixed to said first vehicle for abutment with the horiztonal leg of said tow bar when said tow bar is extended and said vertical leg is coupled to said hitch member to preclude rearward movement of said tow bar relative to said first vehicle, said stop means being positioned to one side of the longitudinal center line of the elongated body portion of said tow bar, and wherein said hitch member is substantially U-shaped in cross-section, the bight portion thereof including an aperture for pivotably receiving the vertical leg of said tow bar, the width of said hitch member between its legs being of a dimension relative to said tow bar so that the legs of said hitch member will limit the pivotal movement of said tow bar relative to said hitch member through abutment with the elongated body portion of said tow bar, whereby upon uncoupling of said vertical leg from said hitch member, the body portion of said tow bar can be rotated within said tow bar retainer means to reverse the planes of orientation of said legs so that the horizontal leg is no longer in abutment with said stop means and said tow bar can be retractably slid rearward to a stowed position beneath said first vehicle.

10. A tow bar and hitch assembly in accordance with claim 9 including means for retaining said vertical leg of said tow bar in coupled relation to said hitch member, said retaining means including a retaining ring connected to the distal end of said vertical leg.

* * * * *